(12) United States Patent
Klassen

(10) Patent No.: US 8,526,062 B2
(45) Date of Patent: Sep. 3, 2013

(54) COLOR LOOKUP TABLE COMPRESSION

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 847 days.

(21) Appl. No.: 12/102,568

(22) Filed: Apr. 14, 2008

(65) Prior Publication Data

US 2009/0257072 A1   Oct. 15, 2009

(51) Int. Cl.
*H04N 1/40* (2006.01)
(52) U.S. Cl.
USPC .......... 358/3.23; 358/1.9; 358/3.27; 358/504; 358/518; 358/523; 382/166; 382/167; 382/232
(58) Field of Classification Search
USPC ............... 358/1.9, 3.23, 3.27, 504, 518, 523; 382/166, 232, 246, 167
See application file for complete search history.

(56) References Cited

U.S. PATENT DOCUMENTS

| 4,853,885 | A | * | 8/1989 | Naoi et al. | 708/270 |
|---|---|---|---|---|---|
| 5,689,589 | A | * | 11/1997 | Gormish et al. | 382/239 |
| 2006/0050074 | A1 | * | 3/2006 | Bassi | 345/427 |
| 2006/0279753 | A1 | | 12/2006 | Yao et al. | |

OTHER PUBLICATIONS

Balaji et al, Hierarchical Compression of Color Look Up Tables, Nov. 2007, 15th Color Imaging Conference Final Program and Proceedings, pp. 261-266.*
Balaji et al., "Hierarchical Compression of Color Look Up Tables," 15*th* Color Imaging Conference Final Program and Proceedings, pp. 261-266 (Nov. 5-9, 2007).
J. Hardeberg, "Acquisition and Reproduction of Colour Images: Colorimetric and Multispectral Approaches," Doctoral Dissertation, l'Ecole Nationale Superieure des Telecommunications (Paris 1999).

* cited by examiner

*Primary Examiner* — King Poon
*Assistant Examiner* — Jamares Q Washington
(74) *Attorney, Agent, or Firm* — Fay Sharpe LLP

(57) ABSTRACT

A technique to compress multidimensional color look-up tables by computing an inexpensive fit to the contents of the tables is provided. At each node of the table, the difference between the result of evaluating the fit and the original value at that node are completed. In one form, the parameters of the fit and the differences are stored and compressed, possibly losslessly.

25 Claims, 4 Drawing Sheets

COLOR LOOKUP TABLE COMPRESSION

BACKGROUND

Color printers typically require use and storage of color lookup tables. This is due to the variety of rendering intents, rendering modes (e.g. halftone screens) and emulations that are available on such systems. In memory-constrained versions of these systems, the color look-up tables typically must be recomputed on the fly, quantized, or compromised (by using fewer tables) and/or may be configured to serve multiple functions—to conserve memory space. For example, U.S. Publication No. 2006/0279753, entitled "Color Printing," naming Yao et al. as inventors and published Dec. 14, 2006, teaches the use of a single multidimensional lookup table for many modes and the implementation of a set of Tone Reproduction Curves (TRCs) to address differences between modes.

In addition, a technique for compression of look-up tables has been disclosed in Aravindh Balaji, Guarav Sharma, Mark Q. Shaw, Randall Guay, "Hierarchical Compression of Color Look Up Tables," 15th *Color Imaging Conference Final Program and Proceedings*, pp. 261-266 (Nov. 5-9, 2007). This technique, however, implements a relatively complicated pre-processing method (using hierarchical differential encoding and a space filling curve) prior to compression.

BRIEF DESCRIPTION

In one aspect of the presently described embodiments, a method comprises determining input data to the multidimensional color look-up table, fitting a mathematical model to the input data, evaluating the mathematical model for each node of the table to obtain a result for each node, computing a difference between the result for each node and the input data at each node, and compressing all differences.

In another aspect of the presently described embodiments, the look-up table includes CMY color space data.

In another aspect of the presently described embodiments, the look-up table includes L*a*b* color space data.

In another aspect of the presently described embodiments, the fitting comprises using a least squares fitting routine.

In another aspect of the presently described embodiments, the mathematical model is a tensor product B-spline model.

In another aspect of the presently described embodiments, the method further comprises rounding the result prior to computing the difference.

In another aspect of the presently described embodiments, the method further comprises storing and compressing selected parameters of the tensor B-spline model.

In another aspect of the presently described embodiments, the compressing is accomplished by using a Lempel-Ziv procedure or a Huffman procedure.

In another aspect of the presently described embodiments, the method comprises evaluating the mathematical model at the nodes, decompressing the differences, and, adding the differences to the evaluated values.

In another aspect of the presently described embodiments, the method comprises storing the differences.

In another aspect of the presently described embodiments, a method comprises determining input data to the multidimensional color look-up table, fitting a tensor product B-spline model to the input data, evaluating the tensor product B-spline for each node of the table to obtain a first result for each node, rounding the first result for each node to obtain a second result, computing a difference between the second result and the input data at each node, selecting parameters of the tensor product B-spline model, compressing the stored differences and compressing the selected parameters of the tensor product B-spline model.

In another aspect of the presently described embodiments, the table look-up includes CMY color space data.

In another aspect of the presently described embodiments, the look-up table includes L*a*b* color space data.

In another aspect of the presently described embodiments, the fitting comprises using a least squares fitting routine.

In another aspect of the presently described embodiments, the compressing is accomplished by a Lempel-Ziv procedure or a Huffman procedure.

In another aspect of the presently described embodiments, the method comprises evaluating the mathematical model at the nodes, decompressing the differences, and, adding the differences to the evaluated values.

In another aspect of the presently described embodiments, the method comprises storing the differences.

In another aspect of the presently described embodiments, a system comprises an interface operative to receive color input data relating to the color image, a memory operative to store the color input data in a plurality of multidimensional color look-up tables and a processor operative to fit a mathematical model to the color input data, evaluate the model to obtain a result for each node of the table, compute a difference between the result and the input data at each node, store all differences, and compress the stored differences.

In another aspect of the presently described embodiments, the system further comprises a print engine operative to print the color image data based on the input data.

In another aspect of the presently described embodiments, the input data is decompressed.

In another aspect of the presently described embodiments, the look-up table includes CMY color space data.

In another aspect of the presently described embodiments, the look-up table includes L*a*b* color space data.

In another aspect of the presently described embodiments, the processor is operative to fit the mathematical model using a least squares fitting routine.

In another aspect of the presently described embodiments, the mathematical model is a tensor product B-spline model.

In another aspect of the presently described embodiments, the processor is further operative to round the result prior to computing the difference.

In another aspect of the presently described embodiments, the processor is operative to store and compress selected parameters of the tensor product B-spline model.

In another aspect of the presently described embodiments, the processor is operative to compress using a Lempel-Ziv procedure or a Huffman procedure.

In another aspect of the presently described embodiments, the processor is operative to store the differences.

DETAILED DESCRIPTION

The presently described embodiments relate to a technique to compute an inexpensive fit (e.g. inexpensive to store and to evaluate) to the contents of a multidimensional lookup table. At each node of the table, the difference between the result of evaluating the fit and the original value at that node are computed. In one form, the parameters of the fit and the differences are stored and compressed, possibly losslessly.

Figure 1:
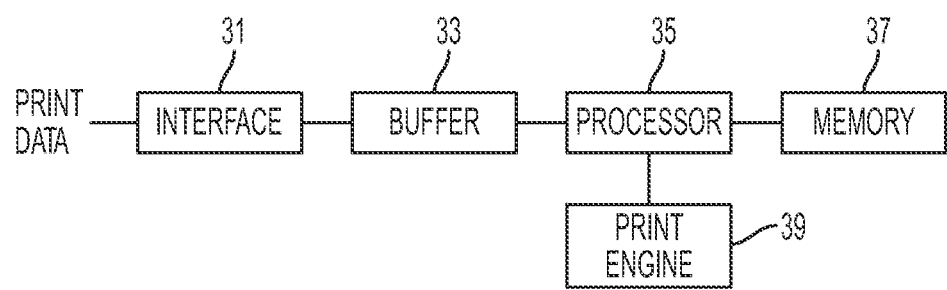
FIG. 1 is a block diagram of a system into which the presently described embodiments may be implemented.

FIG. 1 is a schematic block diagram of an embodiment of a printing apparatus into which the presently described embodiments may be implemented. The system includes an interface 31 that receives print data, for example, from a host computer, and stores the print data in a buffer memory 33. In at least one form, the buffer memory 33 is configured to house multidimensional color look-up tables in which the input print data is organized. In at least one form, as a result of the implementation of the presently described embodiments, compressed color look-up tables are stored in the buffer memory 33. Moreover, the input color data may include CMY color space data or L*a*b* color space data.

A processor 35 is configured to process the print data to produce bit mapped raster data that is stored in a memory 37. A print engine 39 prints an image pursuant to the bit map raster data generated by the processor 35. The print engine 39 can be an electro-photographic print engine such as a xerographic print engine or an ink jet print engine, for example. It should be appreciated that the processor 35, memory 33 and print engine 39 are configured to decompress the color look-up tables (e.g. the input data) to render or print images in accord with the input data.

Figure 2:
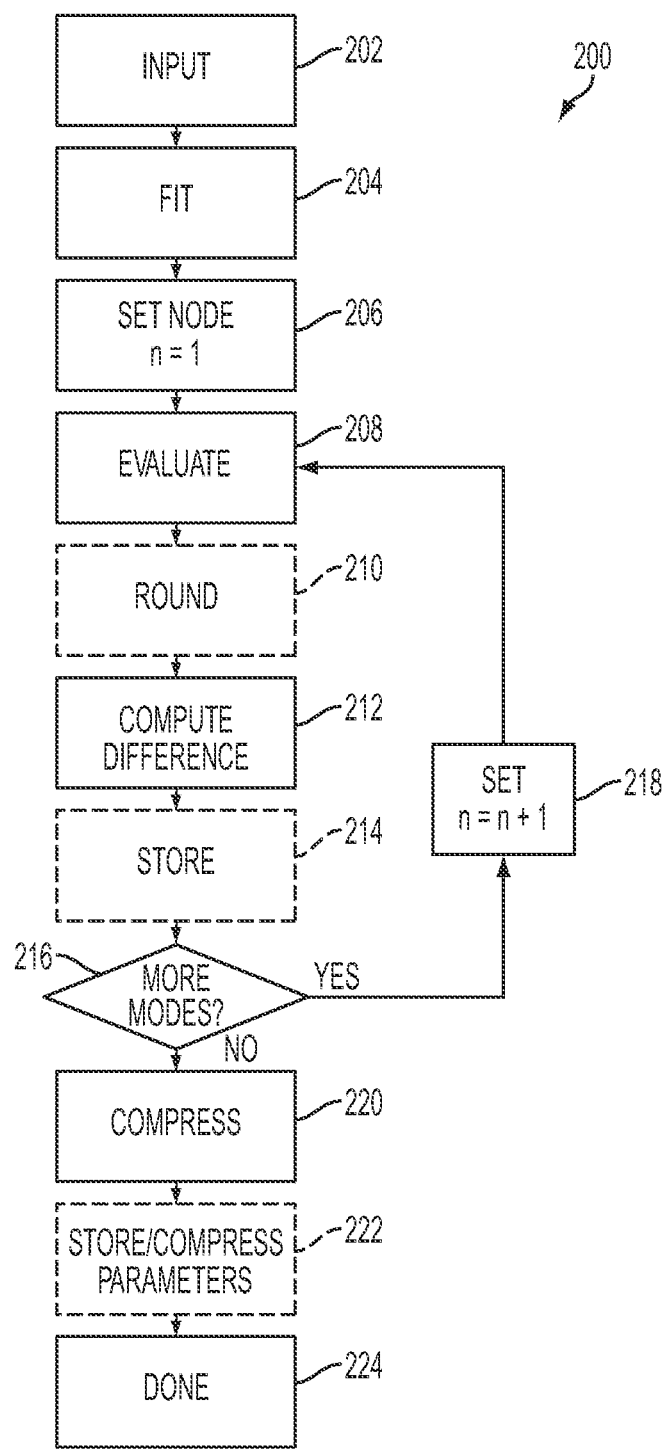
FIG. 2 is a flow chart illustrating a method according to the presently described embodiments.

With reference now to FIG. 2, an example method 200 for compressing color look-up tables according to the presently described embodiments is illustrated. It should be appreciated that the method 200 or similar methods according to the presently described embodiments may be implemented using any of a variety of software routines and/or hardware configurations that may reside at various suitable locations within the system or in communication with the system. For example, suitable routines may be stored in the memory 37 (or memory 33) and executed in the processor 35 of FIG. 1.

The method 200, in one form, is initiated upon the reception of input color data (at 202). It should be appreciated that this input data is stored in the multidimensional color look-up tables. These tables may reside in any suitable location on the system, including within the buffer memory 33. Next, a mathematical model is fit to the input data (at 204). In one form, the mathematical model is a tensor product B-spline model. The selected spline may be represented by the relation $C=f_n(p,c)$, where $P=[P_1, \ldots P_n]$ and $c=[L^*, a^*, b^*]$.

The fitting may be accomplished using a variety of techniques. In one form, the tensor product B-spline is computed by least squares fitting, with 32 bit floating point parameters. As an example, a spline with two segments per dimension, requiring a total 5×5×5 control points, or 500 bytes per output separation, could be used. With uniform knot spacing, only the 5×5×5 control points need to be saved or written out. To evaluate a tensor product B-Spline, the three dimensions are treated in sequence. Thus, to find a point at coordinates (X, Y, Z), the control vertices in the x dimension are treated as control vertices of one-dimensional curves, and all the curves are evaluated at x=X. In the 5×5×5 case, there are 25 such one dimensional curves defined, and 25 values result from the initial evaluations, all lying in the x=X plane. These values are then treated as control vertices of five one dimensional curves running in the y dimension, and those curves are evaluated at y=Y, yielding five control vertices. Finally, those five values are treated as control vertices of a single curve varying in the z direction; it is evaluated at z=Z to yield the final point. Note that the order of the dimensions does not matter, the evaluation could have been x, then z then y, with exactly the same result. More than three dimensions is a straightforward generalization of the three dimensional case.

It should be appreciated that, in addition to the noted tensor product B-spline model, a variety of suitable mathematical models capable of fitting and evaluation at selected data nodes will suffice. For example, a polynomial matrix approach may be used, as described in Hardeberg's thesis, J. Hardeberg, *Acquisition and Reproduction of Colour Images Colorimetric and Multispectral Approaches,* Doctoral Dissertation, l'Ecole Nationale Supérieure des Télécommunications (Paris 1999) which is incorporated herein by reference. In this method, as a color is converted, its components are raised to various powers and multiplied by each other, to form a vector of coefficients, which are then multiplied by a suitable matrix, yielding a resulting vector which is the converted colour. As an example, one might take colors in a color space PQR to another color space STU by first forming the 10 element column vector $[1\ P\ P^2\ Q\ PQ\ Q^2\ R\ PR\ QR\ R^2]T$, and then pre-multiplying it by a 10 by 3 matrix, yielding a three element column vector. The matrix is found by least squares approaches, and its 30 elements would serve as the parameters of the model. Higher order polynomial matrices are also well known in the art, for example a cubic, in whose terms the sum of the exponents may be as high as 3. (Thus, PQR, $R^2Q$ and $P^3$ are all included, but $PQ^2R$ is not). Evaluating the model comprises forming a vector (such as the 10 element vector above), and multiplying that vector by a matrix.

It should be understood that the mathematical model is evaluated to obtain a result for each node in the table. So, the routine selects a node and initializes its location by setting n=1 (at 206). The evaluation, as described above (for example), is then conducted on the data for the first node (at 208) and a result is obtained. In some embodiments, the result is rounded (at 210). The rounding process may be implemented for any of a number of reasons, including the fact that the data may be provided in a certain length per separation—such as eight (8) bits per separation (in which case the result could be rounded to eight (8) bits).

Figure 3:
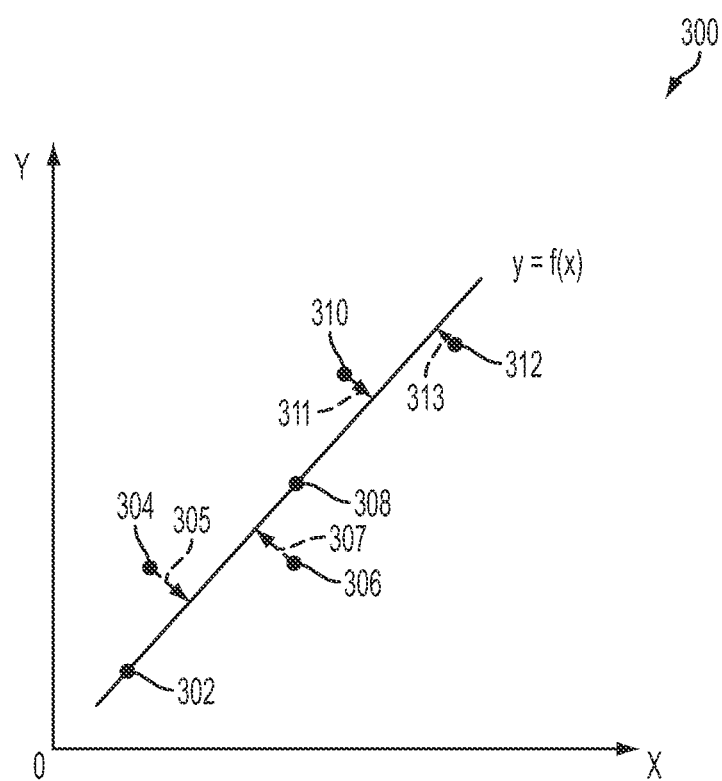
FIG. 3 is a graphic illustration of a one-dimensional function to explain aspects of the presently described embodiments: and, FIG. 4 is a flow chart illustrating a method according to the presently described embodiments.

A difference between the result for the node (or the rounded result) and the input data at the node is then computed (at 212). This process may be conducted in a variety of suitable manners which are a function of the mathematical model that is used. To explain in the context of a simplified one-dimensional analysis, reference is made to FIG. 3. It will be appreciated by those of skill in the art that the one-dimensional analysis is provided primarily for explanatory purposes. The explanation for the two- and three-dimensional analyses follows substantially the same conceptual reasoning but is more difficult to illustrate—and thus is omitted here for ease of explanation and illustration. It should be further appreciated that the implementation of the presently described embodiments results in increased advantages and benefits when multi-dimensional data is considered. Nonetheless, in FIG. 3, a graph 300 illustrates the fitting of a function y=f(x) to data points 302, 304, 306, 308, 310 and 312. As shown, there is no difference between the fitted function y=f(x) and points 302 and 308. However, there are differences between the function y=f(x) and other data points. Data points 304, 306, 310 and 312 have differences 305, 307, 311 and 313.

With reference back to FIG. 2, the difference between the result for the node (or the rounded result) and the input data at the node is then optionally stored (at 214). In one form, the difference values are typically small, e.g. small enough to fit within a byte of data. As an example, the differences could be 0, +1, or −1. Of course, the storage of such data may be accomplished in a variety of suitable manners. It should also be appreciated that storage of these differences may not be required, or only required in a buffer for a relatively short period of time.

A determination is then made as to whether more nodes should be evaluated (at 216). If so, the node number is incremented by setting n=n+1 (at 218), and steps 208, 210 (if necessary), 212 and 214 are performed. If all nodes of the input data (or multidimensional color look-up table) have been evaluated, then all the differences (in some embodiments, these may be stored differences) are compressed. Any suitable compression technique may be used. However, in some forms, Lempel-Ziv or Huffman procedures are used.

In some forms, the method according to the presently described embodiments also includes the storage and compression of parameters of the mathematical model (e.g. the parameters of the contemplated tensor product B-spline model) (at 222). The decision to conduct this process is a function of the selected mathematical model and the available storage space. Doing so may not be justified in some cases in addition if a tensor product B-spline is used as the mathematical model, the spline parameters may not compress very well. If that is the case, they can be left uncompressed. The process is then completed (at 224).

As an example, a minimal quality lookup table mapping from CMYK to L*a*b*, may be sampled at 17×17×17 with 8 bit values per output channel, at each node. This is sufficient for a single, fixed UCR/GCR (Under Color Removal/Gray Component Replacement) mapping, so that for any CMY combination there is only one CMYK that would be printed. Hence, it can be stored as a 3 dimensional table. Similarly, L*a*b* to CMYK tables can be stored, using 17×17×17 sampling of L*a*b* space, with 8 bit CMY values per node, and a fixed conversion from CMY to CMYK.

It will be appreciated that better quality would be obtained by storing more than 8 bits per node, because the nodes will be interpolated to yield what are often interpreted as 8 bit values before halftoning. However, 8 bits is close to sufficient. If more than 8 bits are needed, the advantages of this invention increase. Similarly, a table that is larger than 17×17×17 will typically provide somewhat better quality. As can be seen, the advantages of the method of the presently described embodiments increase with higher input resolution. Nonetheless, for the contemplated case, the compression ratio on a CMY(K) to L*a*b* mapping in one test case is 5.95:1.

Figure 4:
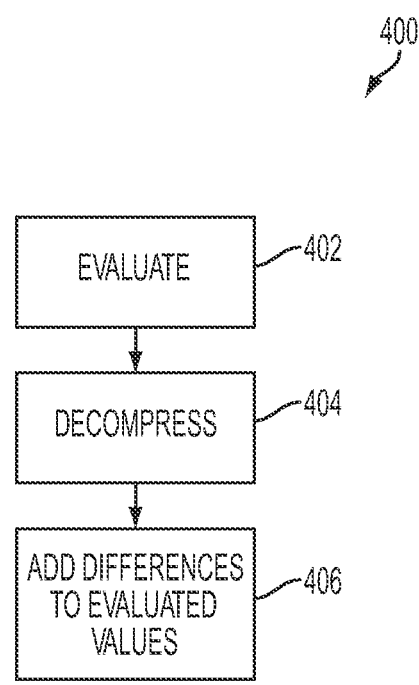

With reference now to FIG. 4, a method 400 for decompressing the color look-up table data is shown. Once it is determined that the content of the color look-up tables should be decompressed, the mathematical model is evaluated at each node to obtain an evaluated, or second, result (at 402). It will be understood by those of skill in the art that decompression of the color look-up tables is typically advantageously conducted prior to the rendering or printing of the images that are based on the input data. Moreover, the evaluation corresponds to the evaluation that is accomplished during the compression process. The differences (which were previously determined and may be stored) are then decompressed (at 404). Again, in at least one form, the decompression technique corresponds to the compression technique that was used to compress the differences. Then, the evaluated or second results are added to the decompressed differences (at 406). This provides the system with uncompressed input data that can be used to render or print images.

It should be appreciated that the method 400 or similar methods according to the presently described embodiments may be implemented using any of a variety of software routines and/or hardware configurations that may reside at various suitable locations within the system or in communication with the system. For example, suitable routines may be stored in the memory 37 (or memory 33) and executed in the processor 35 of FIG. 1.

Advantageous applications of the presently described embodiments may include any class of printers where the tables are expensive to store due to the lack of a hard drive and/or where engine-specific conversions would need to be stored with an integrated marking engine (IME) controller for each halftone and, possibly, rendering intent. Currently active conversions would be stored as lookup tables. Other conversions—not switchable on a per-page basis (such as different emulations)—would be stored compressed and loaded as needed. Spatially varying tables are particularly memory intensive, and could also benefit from this approach, whenever more than one such table is needed, and switching between them is done between pages.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for compressing a multidimensional color look-up table of a color rendering system, the method comprising:
   determining input data to the multidimensional color look-up table of the color rendering system;
   fitting a mathematical model to the input data based on a least squares approach;
   evaluating the mathematical model for each node of the table to obtain a result for each node;
   computing a difference between the result for each node and the input data at each node; and,
   compressing all differences.

2. The method as set forth in claim 1 wherein the look-up table includes CMY color space data.

3. The method as set forth in claim 1 wherein the look-up table includes L*a*b* color space data.

4. The method as set forth in claim 1 wherein the mathematical model is a tensor product B-spline.

5. The method as set forth in claim 1 further comprising rounding the first result prior to computing the difference.

6. The method as set forth in claim 4 further comprising storing and compressing selected parameters of the tensor product B-spline model.

7. The method as set forth in claim 1 wherein the compressing is accomplished by using at least one of a Lempel-Ziv procedure and a Huffman procedure.

8. The method as set forth in claim 1, further comprising:
   evaluating the mathematical model at the nodes;
   decompressing the differences; and,
   adding the differences to the evaluated values.

9. The method as set forth in claim 1 further comprising storing the differences.

10. A method for compressing a multidimensional color look-up table of a color printing system, the method comprising:
   determining input data to the multidimensional color look-up table of the color printing system;
   fitting a tensor product B-spline to the input data using a least squares fitting routine;
   evaluating the tensor product B-spline for each node of the table to obtain a first result for each node;

rounding the first result for each node to obtain a second result;

computing a difference between the second result and the input data at each node;

selecting parameters of the tensor product B-spline;

compressing all differences; and, compressing the selected parameters of the tensor product B-spline.

11. The method as set forth in claim 10 wherein the table look-up includes CMY color space data.

12. The method as set forth in claim 10 wherein the look-up table includes L*a*b* color space data.

13. The method as set forth in claim 10 wherein the compressing is accomplished by at least one of a Lempel-Ziv procedure and a Huffman procedure.

14. The method as set forth in claim 10, further comprising:
evaluating the mathematical model at the nodes;
decompressing the differences; and,
adding the differences to the evaluated values.

15. The method as set forth in claim 10 further comprising storing the differences.

16. A system for processing a color image comprising:
an interface operative to receive color input data relating to the color image;
a memory operative to store the color input data in a plurality of multidimensional color look-up tables; and,
a processor operative to fit a mathematical model to the color input data based on a least squares approach, evaluate the model to obtain a result for each node of the table, compute a difference between the result and the input data at each node, store all differences, and compress the stored differences.

17. The system as set forth in claim 16 further comprising a print engine operative to print the color image data based on the input data.

18. The system as set forth in claim 17 wherein the input data is decompressed.

19. The system as set forth in claim 16 wherein the look-up table includes CMY color space data.

20. The system as set forth in claims 16 wherein the look-up table includes L*a*b* color space data.

21. The system as set forth in claim 16 wherein the mathematical model is a tensor product B-spline model.

22. The system as set forth in claim 16 wherein the processor is further operative to round the result prior to computing the difference.

23. The system as set forth in claim 21 wherein the processor is operative to store and compress selected parameters of the tensor product B-spline model.

24. The system as set forth in claim 16 wherein the processor is operative to compress using at least one of a Lempel-Ziv procedure and a Huffman procedure.

25. The system as set forth in claim 16 wherein the processor is operative to store the differences.

* * * * *